UNITED STATES PATENT OFFICE.

ROGER B. GRIFFIN, OF AUBURNDALE, MASSACHUSETTS.

PROCESS OF RECOVERING GREASE, &c., FROM WOOL-WASHINGS.

SPECIFICATION forming part of Letters Patent No. 475,395, dated May 24, 1892.

Application filed July 16, 1889. Serial No. 317,728. (No specimens.)

*To all whom it may concern:*

Be it known that I, ROGER B. GRIFFIN, of Auburndale, county of Middlesex, State of Massachusetts, have invented an Improvement in the Process of Recovering Grease and other Ingredients Derived from Scouring Wool, of which the following description is a specification.

The object of my invention is to attain an inexpensive and efficient method of separating and obtaining in merchantable condition the grease and other valuable ingredients contained in the wash-waters of wool-scouring establishments.

The water that has been used in wool-washing establishments for cleaning or scouring the wool preparatory to spinning contains a large quantity of grease, and also potash and ammonia, which materials are, however, so intimately mingled that it is extremely difficult to separate out the pure grease from the water and other materials, so that the wash-waters are usually allowed to run to waste. This not only involves loss of the valuable materials contained in them, but also produces a large amount of offensive matter, which is very difficult to dispose of and in many cases causes considerable trouble and complaint by fouling the waters of running streams into which the wash-waters are discharged. The grease has in some cases been extracted from the wash-waters by chemical processes, which result in the loss of the other ingredients and which are, moreover, so expensive that they have not been generally adopted, and in some cases the potash and ammonia have been saved by a process of burning or roasting, which results in the loss of the grease.

I have discovered a process by which the grease can be separated from the water and other ingredients at moderate expense and without waste of the other ingredients of the wash-water, the main feature of said invention consisting in mixing with the concentrated materials of the wash-water an absorbent material or filler which is of an acid character and the effect of which is to break up the emulsion of the grease and water, as well as to separate the ammonia and potash from the grease, which latter may then be abstracted or removed from the mixture by any mechanical process of separation—as, for example, by dissolving out the grease, or by straining or pressing in cloth bags, the grease passing out through the interstices and being substantially pure, while the other ingredients remain in the cake formed by the absorbent material added, which cake is valuable as a fertilizer.

The grease and other materials may be separated and saved in accordance with this invention in the following manner, which is believed to be the best manner of practicing my invention.

The wash-waters are first concentrated by evaporation in any suitable apparatus. The residue, which still contains a large percentage of water, forming an emulsion with the grease, is then mixed with about twenty per cent. of its own weight of an absorbent material or filler, preferably in powdered form. Any absorbent material may be used and the proportion employed may be widely varied from that just stated; but the best results have been attained in practice by using acid phosphate of lime in about the proportion specified. If an inert material or other absorbent material than acid phosphate of lime is employed, it is necessary to add a slight amount of acid to it in order to effect the separation of the potash and ammonia from the grease; but when acid phosphate of lime is used as the absorbent material no additional acid is required, as the acid phosphate of lime contains both a sufficient amount of acid to effect the separation of the materials and also contains a sufficient amount of insoluble inert material to form a solid mass or cake from which the grease can be pressed, it being essential that the material added to the concentrated wash-waters should have these properties. When these materials have been thoroughly mixed, the whole is heated to about the boiling-point, preferably in a shallow flat-bottomed steam-jacketed pan, so as to drive off the water that remained in the emulsion before the said acid absorbent material was added. The material should be constantly stirred during the heating operation, which is continued so long as steam arises from the mixture and until a slight smoky fog appears, indicating that the more volatile portions of the grease are beginning to decompose. The material, which is then in the condition of a thin paste, is removed from the pan and transferred to common bags or cloths suitable for pressing and straining and is subjected to pressure while still hot in a suitable press, the effect of which is to extract the grease, which passes out through the interstices of the cloth.

Since in this process all the wash-water or solution is evaporated, the final product before pressing must contain all the salts previously dissolved and the grease, and since the grease is expelled from the interstices or spaces of the filler the other materials previously in solution—that is, the potash and ammonia originally present in the wash-water—will remain in the cake of absorbent or filling material from which the grease has been expelled.

The remaining cake is of value as a fertilizer and the grease is nearly pure and is suitable for use as a dressing for leather or for any other use to which wool-grease is commonly put.

When acid phosphate of lime is used as the acid absorbent material for breaking up the emulsion so that the pure grease may be strained out, it retains its original value as a fertilizer in the resulting cake. The said resulting cake has its value as a fertilizer still further enhanced by the addition of the ammonia and potash originally present in the wash-water, which materials remain in the cake in a form readily soluble or available for plant-food.

By this process the pure grease is obtained at moderate expense, the cost of production being much less than the value of the grease and other valuable materials obtained, so that the wash-waters, instead of being an offensive waste product, become a source of profitable manufacture, the process being carried on without any waste or worthless residue.

While the manner of effecting the final separation of the grease from the other valuable products above described—namely, by straining—is preferred, it is not essential to the invention that such final separation should be effected in this manner, as instead of straining the grease out from the resulting compound it might be removed by dissolving by means of ether or any suitable volatile solvent. The employment of the absorbent material, as described, breaks up the emulsion, permitting the water to be thrown off from the grease by evaporation, and freeing the grease from the potash and ammonia, so that it can be readily separated therefrom without further chemical action.

I claim—

1. The improvement in the art of recovering wool-grease from the waste waters of wool-washings, which consists in concentrating the waste wash-waters by evaporation, mixing the residue with an acid absorbent or filler, preferably acid phosphate of lime, heating the mixture to throw off the water, and then separating the grease from the remaining solid materials, substantially as described.

2. The combined process of recovering wool-grease from the waste waters of wool-washings and forming plant-food from the remainder, which consists in concentrating the waste wash-waters by evaporation, mixing the residue with an acid absorbent or filler, preferably acid phosphate of lime, heating the mixture to throw off the water, and then separating the grease and the residue by mechanical straining, substantially as described.

In testimony whereof I have signed my name to this specification in the presence of two subscribing witnesses.

ROGER B. GRIFFIN.

Witnesses:
JOS. P. LIVERMORE,
M. E. HILL.